No. 732,215.

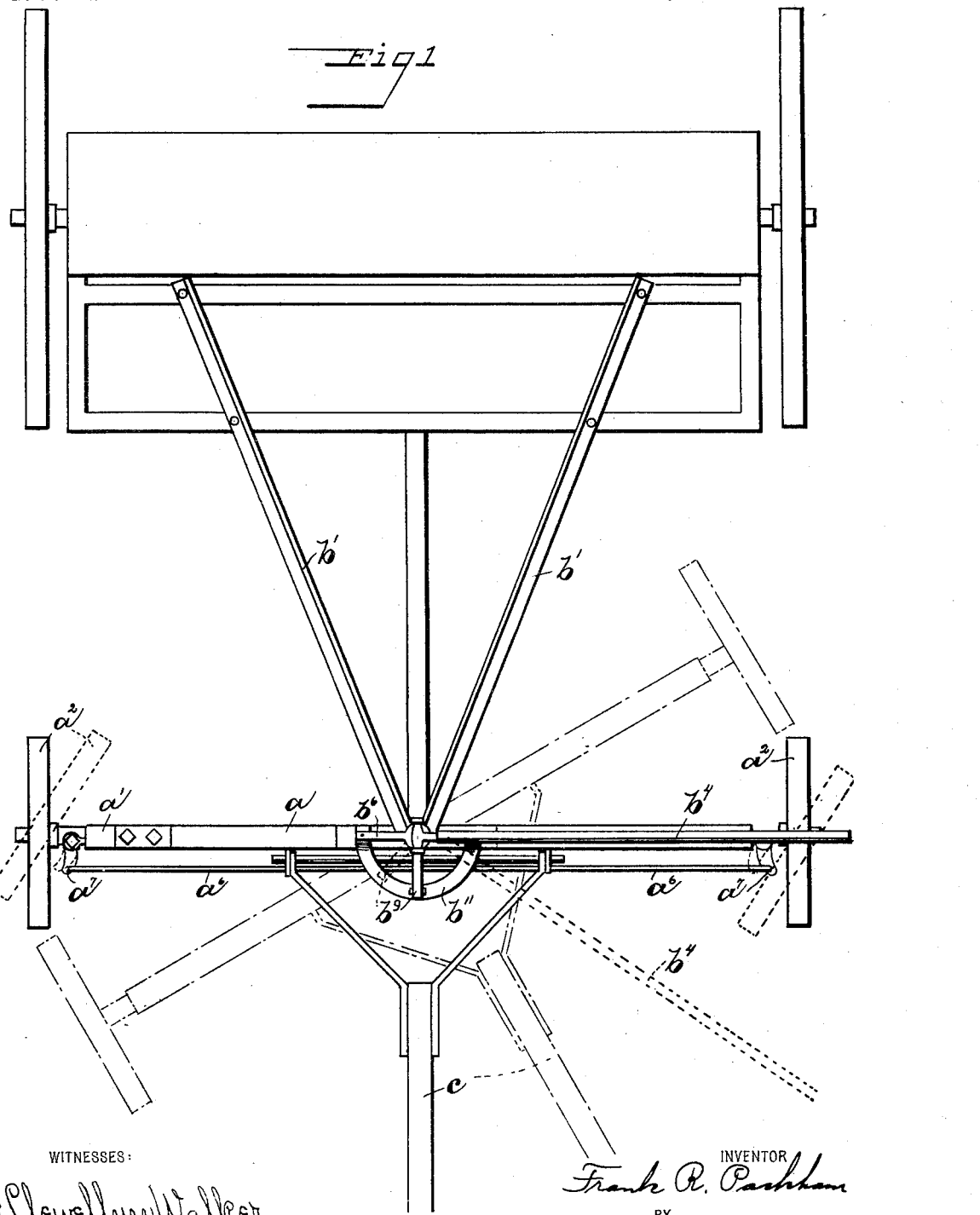

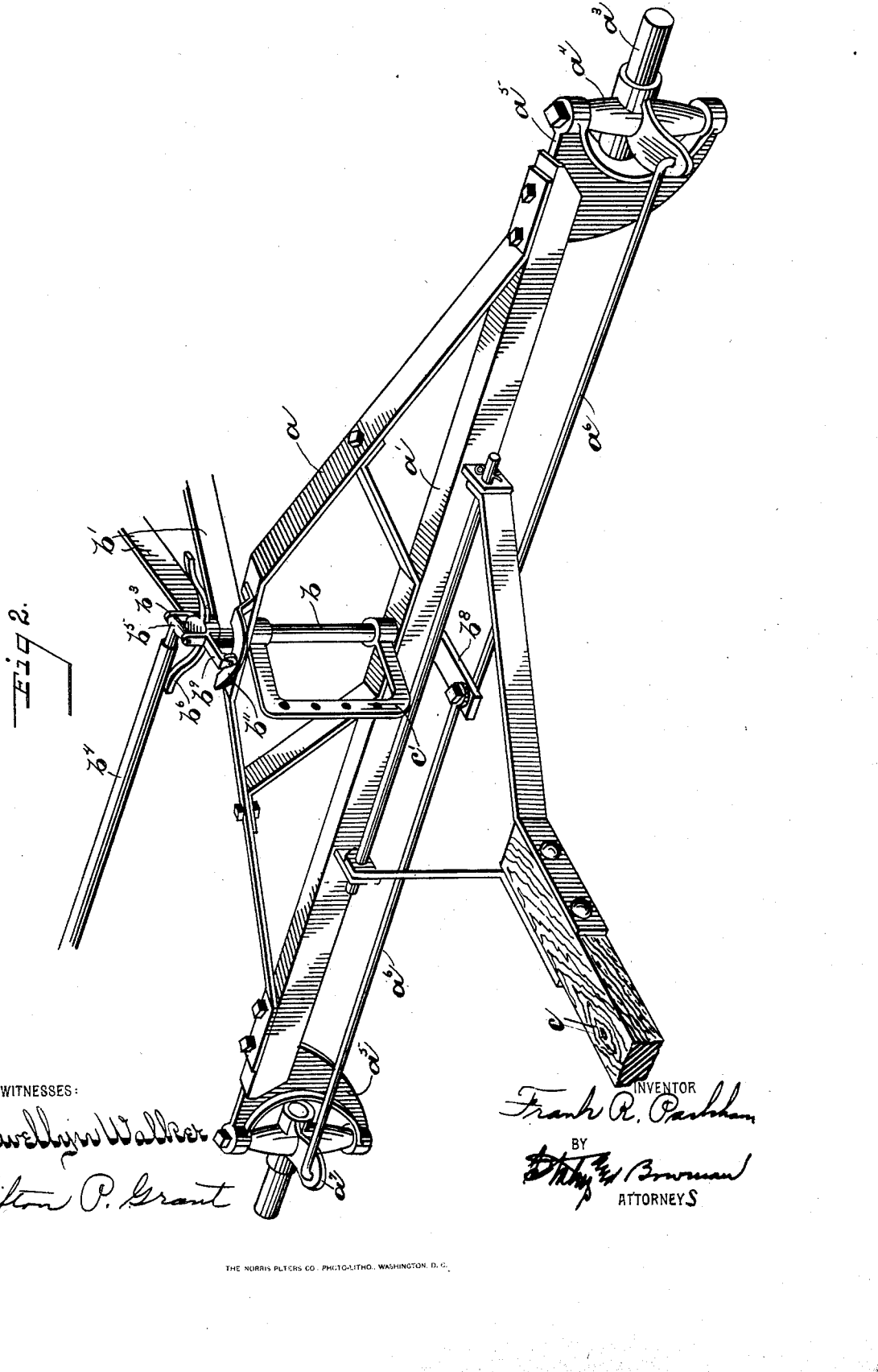

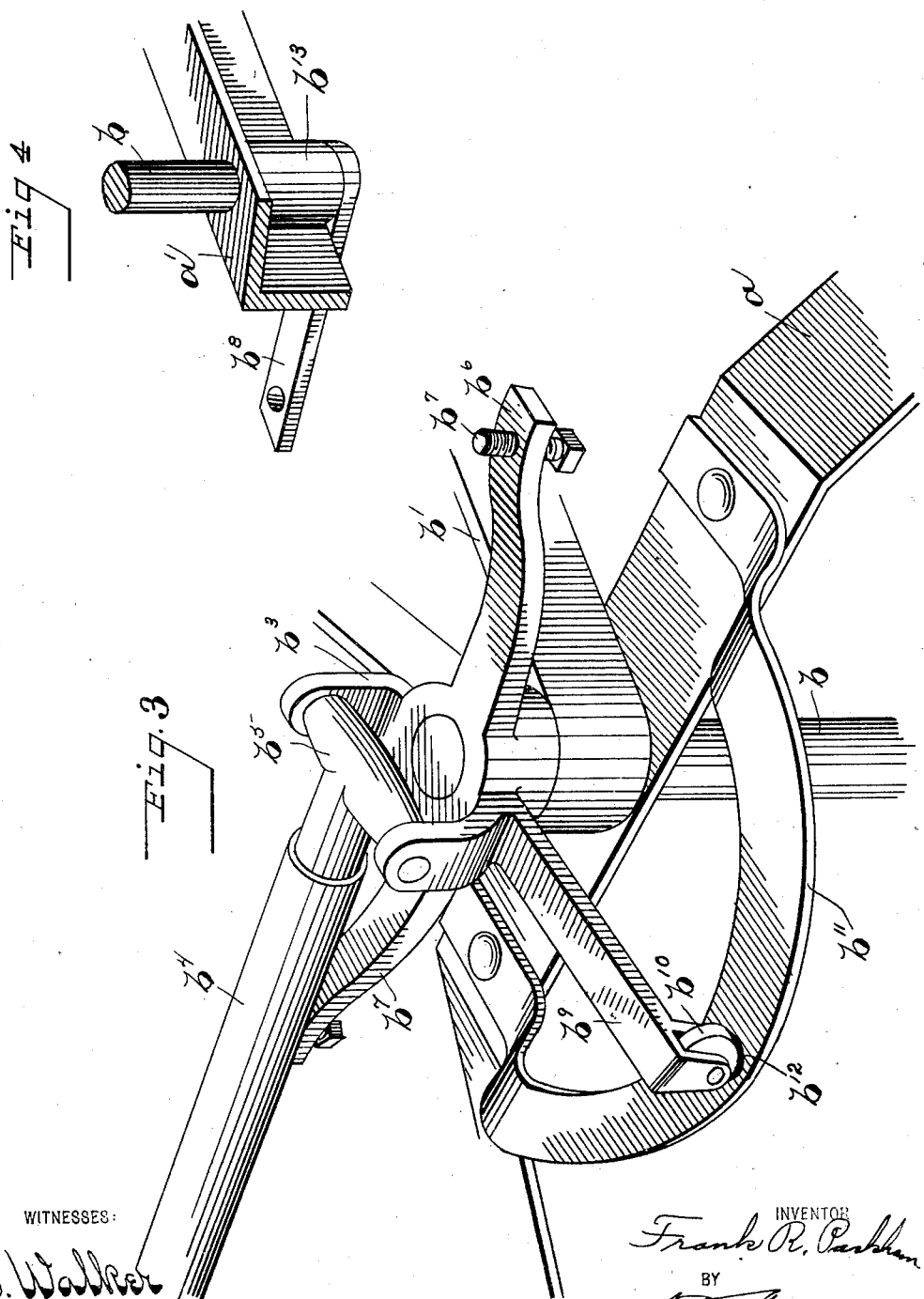

Patented June 30, 1903.

UNITED STATES PATENT OFFICE.

FRANK R. PACKHAM, OF SPRINGFIELD, OHIO, ASSIGNOR, BY MESNE ASSIGNMENTS, TO AMERICAN SEEDING MACHINE COMPANY, OF JERSEY CITY, NEW JERSEY, A CORPORATION OF NEW JERSEY.

STEERING-TRUCK FOR AGRICULTURAL IMPLEMENTS.

SPECIFICATION forming part of Letters Patent No. 732,215, dated June 30, 1903.

Application filed December 26, 1902. Serial No. 136,680. (No model.)

*To all whom it may concern:*

Be it known that I, FRANK R. PACKHAM, a citizen of the United States, residing at Springfield, in the county of Clark and State of Ohio, have invented certain new and useful Improvements in Steering-Trucks for Agricultural Implements, of which the following is a specification.

My invention relates to agricultural implements, and more particularly to a steering-truck or fore-carriage for this class of machines. Heretofore, so far as I am aware, fore-carriages for this purpose have been so constructed that the draft-animals take no part in the guidance of the implement. This construction places in the hands of the operator the entire guidance and control of the machine, and, especially in wide machines, the resistance to a change in direction becomes so great that the operator cannot manipulate the machine without danger to himself unless back gears or compound leverage be employed, which is both cumbersome and expensive. With this construction it is also obvious that in hilly country various devices in the form of brakes or lock-chains must be used, and, furthermore, when the machine is to be moved from place to place a tongue or pole must be employed to guide the machine upon the road, which it is necessary to remove when the machine is in use in the field; otherwise the tongue or pole would strike the draft-animals when the direction of the steering-truck is changed.

The object of my invention is to provide an improved steering-truck or fore-carriage in which are employed a tongue or pole and hitch to which the draft-animals are attached, by which the machine is not only drawn but also guided by the animals, the guidance, however, being subject to an independent control by the operator, whereby the animals may continue in a straight line, and yet the machine can be deflected to either side by the operator to correct slight deviations in the course of the work being done.

My invention consists in the constructions and combinations hereinafter described, and set forth in the claims.

In the accompanying drawings, Figure 1 is a plan view of an implement with a truck attached thereto embodying my invention. Fig. 2 is a perspective view of the truck with the ground-wheels omitted. Fig. 3 is a perspective view of a portion of the truck-frame and king-bolt, showing the runway with locking device and the operating-lever; and Fig. 4 is a detail showing the connection at the the lower end of the king-bolt.

Like parts are represented by similar letters of reference in the several views.

In carrying out the invention a steering-truck or fore-carriage is employed constructed and coupled to the machine in the following manner.

The fore-carriage or truck consists of a suitable frame $a$, having a cross-beam $a'$, extending between the carrying-wheels $a^2$ of the truck, said wheels being mounted on spindles $a^3$, which are carried by trunnions $a^4$, extending transversely thereto, pivoted in suitable brackets $a^5$ on the respective ends of said cross-beam in such manner that they may be turned about the ends of the cross-beam to deflect or change the direction of the travel of the truck-wheels. The truck is coupled to the machine or implement by a king-bolt $b$, extending through bearings in suitable reaches $b'$, extending from the frame of the machine or implement and through the frame and cross-beam of the truck, said king-bolt being provided at its upper end with a yoke $b^3$ fixed thereto, formed to carry a lever $b^4$, having laterally-extending trunnions $b^5$ pivoted in said yoke, so that said lever may be thrown over and operated from either side of the machine, and said yoke is further preferably provided with ears $b^6$, having adjustable contacting portions, such as set-screws $b^7$, to hold the lever in proper position. The lower end of said king-bolt is provided with a laterally-extending arm $b^8$, to which is pivoted one end of each of two bars $a^6$, the other ends of which are pivoted to lateral projections $a^7$ on the trunnions of the spindles for the respective carrying-wheels of the truck. By operating the lever pivoted in the yoke it will be seen that the king-bolt is turned and operates the connecting devices to deflect the travel of the truck-carrying wheels, and thereby change the course of the machine.

The tongue or pole $c$ and hitch $c'$ for the draft-animals are attached to the steering-truck frame, the hitch being made, preferably, in the form of a yoke carried by the king-bolt, and the hitch is made adjustable by the perforations $b^{14}$. The yoke at the upper end of the king-bolt is also provided with a lateral extension $b^9$, preferably carrying a roller $b^{10}$, which travels on a spring table or runway $b^{11}$, fixed to the truck-frame, said table or runway being provided with a depression $b^{12}$, in which said extension or roller rests and is held by the spring tension of said table when the truck-carrying wheels travel in line with the draft-animals, thus locking it in that position. A spool $b^{13}$ is provided between the frame and arm $b^8$ to give an increased bearing for the lower end of the king-bolt.

By this construction it will be seen the machine may be turned at the end of the course in the field or upon the road like an ordinary four-wheeled wagon, as shown by dot-and-dash lines in Fig. 1, or when in use in the field the machine or implement may be temporarily deflected from its course, as shown by dotted lines in Fig. 1, without jarring or jerking by a movement of the operating-lever, while the draft-animals continue in the course, and the movement being at the rear end of the pole it will not strike the animals. Furthermore, the truck-wheels being pivoted at the spindle-trunnions the wheels turn substantially on a pivot when they contact with the ground, which permits the truck to be deflected a distance approximately equal in extent to the distance traveled while so deflected, whereas when spindles are fixed in the usual way the inside wheel of the turn must be pulled backward against the travel of the machine and the opposite wheel correspondingly forward, requiring more power as well as a greater movement of the lever. The operating-lever gives ample purchase for the easy control of the truck-carrying wheels. It has been found that a boy may be employed to operate it in the roughest as well as in hilly fields, and the locking device between the yoke and the truck-frame prevents the turning of the truck-wheels in passing over obstructions. Furthermore, as soon as the necessary deflection has been made under the control of the operator by his movement of the operating-lever the truck-wheels return to normal position, are locked in that position, and the machine is then under the guidance of the draft-animals.

Having thus described my invention, I claim—

1. The combination with a truck and devices adapted to attach and place the guidance of said truck normally under the control of the means employed in drawing the machine, the implement to be drawn, and connections from said truck to said implement, of means under the control of the operator to temporarily vary the direction of travel of said implement without said devices interfering with the movement in a straight course of the means employed in drawing the machine.

2. The combination with a truck and devices adapted to attach and place the guidance of said truck normally under the control of the draft-animals, the implement to be drawn, and connections from said truck to said implement, of means under the control of the operator to temporarily vary the direction of travel of said implement without said devices interfering with the movement of said animals in a straight course.

3. The combination with a truck and devices, including a pole, adapted to attach and place the guidance of said truck normally under the control of the draft-animals, the implement to be drawn, and connections from said truck to said implement, of means under the control of the operator to temporarily vary the direction of travel of said implement without said pole interfering with the movement of said animals in a straight course.

4. The combination with a truck and devices secured to said truck and adapted to attach and place the guidance of said truck normally under the control of the means employed in drawing the machine, the implement to be drawn, and a pivoted connection joining said truck and implement, of means under the control of the operator to temporarily vary the direction of travel of said truck and implement without said devices interfering with the movement in a straight course of the means employed in drawing the machine.

5. The combination with a truck having spindles for the ground-wheels pivoted thereon and devices to attach the means employed to draw the implement, the implement to be drawn, a connection from said truck to said implement, including a king-bolt between said connection and truck, of a lever on said king-bolt and connections from said bolt to said pivoted spindles, substantially as and for the purpose specified.

6. The combination with a truck having spindles for the ground-wheels pivoted thereto, the implement, and connections between said truck and implement, including a king-bolt, said truck and implement in their travel being normally under control of the means employed in drawing same, of connections from said king-bolt to said spindles, devices to lock same in position for the normal travel of said ground-wheels, and means to unlock said devices and temporarily vary the direction of travel of said wheels while the means employed in drawing the machine continue in a straight course.

7. In a truck such as described, having a connection with the implement to be drawn, the combination with pivoted spindles for the ground-wheels and a king-bolt with connections to said spindles, of a runway on said truck and a projection fixed on said bolt adapted to travel on said runway, said runway being adapted to hold said projection in one position from movement for the normal travel of said wheels, and means on said bolt to release said projection and change the direction of travel of said wheels, for the purpose specified.

8. In a truck such as described, having a connection with the implement to be drawn, the combination with the pivoted spindles for the ground-wheels, and a king-bolt with connections to said spindles, of a spring-runway on said truck and a projection fixed to said bolt having a roller to travel on said runway, said runway having a depression therein to receive said roller and hold said projection in one position from movement for the normal travel of said wheels, and means to release said projection and change the direction of travel of said wheels, for the purpose specified.

9. In a truck such as described, the combination with a king-bolt, a runway, a projection fixed on said bolt adapted to travel on said runway, said runway being further adapted to hold said projection in one position from movement, and a lever on said bolt to release said projection and turn said bolt, for the purpose specified.

10. In a truck such as described, the combination with a king-bolt, a spring-runway, a projection fixed on said bolt having a roller adapted to travel on said runway, said runway having a depression therein adapted to receive said roller and hold said projection in one position from movement, a lever on said bolt to release said projection and turn said bolt, said lever being pivoted to said bolt and adapted to be operated from either side of the truck.

11. In a truck such as described, the combination with a king-bolt, of a lever pivoted to said bolt and adapted to be operated from either side of the truck, and means to hold and adjust the height at which the free end of the lever is carried.

In testimony whereof I have hereunto set my hand this 23d day of December, A. D. 1902.

FRANK R. PACKHAM.

Witnesses:
CHAS. I. WELCH,
CLIFTON P. GRANT.